(12) United States Patent
Brink

(10) Patent No.: US 6,535,502 B1
(45) Date of Patent: Mar. 18, 2003

(54) PILOT SYMBOLS

(75) Inventor: Stephan ten Brink, Allmersbach (DE)

(73) Assignee: Agere Systems Inc., DE (US)

( * ) Notice: Subject to any disclaimer, the term of this patent is extended or adjusted under 35 U.S.C. 154(b) by 0 days.

(21) Appl. No.: 09/338,642

(22) Filed: Jun. 23, 1999

(30) Foreign Application Priority Data

Jun. 30, 1998 (EP) ............................................. 98305165

(51) Int. Cl.$^7$ ................................................. H04J 3/00
(52) U.S. Cl. ...................... 370/345; 370/442; 370/500
(58) Field of Search ................................ 370/328, 329, 370/336, 337, 345, 347, 348, 431, 432, 442, 443, 444, 478, 498, 500, 536, 321, 320, 335, 342, 441; 455/422, 447, 450

(56) References Cited

U.S. PATENT DOCUMENTS

| | | | |
|---|---|---|---|
| 5,241,544 A | * 8/1993 | Jasper et al. | 370/478 |
| 5,586,122 A | * 12/1996 | Suzuki et al. | 370/347 |
| 5,652,752 A | * 7/1997 | Suzuki et al. | 370/337 |
| 5,848,357 A | * 12/1998 | Dehner et al. | 455/447 |

FOREIGN PATENT DOCUMENTS

| | | | |
|---|---|---|---|
| EP | 0 810 742 A2 | 5/1997 | H04B/1/707 |
| EP | 0 851 601 A2 | 12/1997 | H04B/1/707 |
| WO | WO 93/09622 | 5/1993 | H04L/5/12 |

OTHER PUBLICATIONS

European Search Report, dated Dec. 14, 1998.

* cited by examiner

Primary Examiner—Nay Maung
Assistant Examiner—Quochien B. Vuong
(74) Attorney, Agent, or Firm—Harness, Dickey & Pierce, PLC

(57) ABSTRACT

The invention includes a method of inserting pilot symbols into communication signals in which a plurality of signals to be transmitted are generated; each signal is divided into frames and each frame consists of a plurality of blocks. A pilot signal block is inserted into each frame of each signal before transmission. The pilot signal blocks are inserted in a time staggered fashion, spread though out the frame. The pilot symbols are time-staggered using an arbitrary algorithm for the pilot symbol insertion. This enables each receiver to perform more accurate, continuous channel estimation and results in a reduced Bit Error Rate (BER) and an improved Quality of Service (QoS). A receiver according to the invention makes use of pilot symbols of all other users in the system in order to improve its channel estimation for user k and this gives more reliable data detection.

11 Claims, 7 Drawing Sheets

PILOT SYMBOLS

CROSS-REFERENCED TO RELATED APPLICATION

This application claims priority of European Patent Application No. 98305165.7, which was filed on Jun. 30, 1998.

FIELD OF THE INVENTION

This invention relates to a method and apparatus for inserting pilot symbols into communication signals, and in particular to a protocol for inserting staggered pilot symbols into a synchronous multiple user Code Division Multiple Access (CDMA) signals.

BACKGROUND OF THE INVENTION

In radio communication systems, multiplexing schemes are employed to share common frequency bandwidth between multiple users. This enables one terminal to communicate with another over a radio channel using a coded spread spectrum signal with codes which are almost uncorrelated, thereby providing a multiple access system in which the collisions between signals broadcast concurrently are not destructive. In CDMA systems, the signal from each of N different users is multiplexed by substituting each bit within the signal by a number of shorter bits, called "chips", chosen according to a particular "channelization code". Since the occupied bandwidth expands after the substitution, this process is often called "spreading" and CDMA systems are often referred to as spread spectrum systems. After spreading, the signal from each user occupies the total available bandwidth. The signal is detected and decoded at a receiver by means of correlation with the appropriate channelization code.

In multi-user CDMA systems all signals transmitted from the same transmitter may be made synchronous, i.e. all bits, and therefore all chips, are aligned in time as in, e.g., the base station transmitter for a downlink communication, i.e. base station to mobile station communication. This allows for the use of orthogonal channelization codes which prevent multi-user interference, although some cross-talk due to multipath propagation may still occur. The multipath propagation can be accounted for by "rake"-detection at the receiver. This means that the receiver applies several detection "fingers", with each finger detecting a particular multipath component. The finger outputs are then combined to finally form the improved received signal. For simplicity of the description we assume a single path channel and hence do apply a "single finger" receiver rather than a full rake receiver. The invention works for a rake receiver accordingly.

Coherent detection is used to improve the detection and decoding process at the receiver. In order to facilitate the coherent detection process the receiver needs to estimate the current channel conditions which may be time varying and which may also depend upon the propagation environment. Typically, pilot symbols, whose data information is known to the receiver, are inserted into the signal at the transmitter. For example, one continuous pilot signal, using a dedicated "pilot channelization code". Alternatively, the transmitter may insert pilot symbols periodically, using the individual channelization codes of each multiplexed signal; thus each signal has its own time-multiplexed pilot symbols, inserted in between data symbols. At the receiver, changes in the channel conditions are interpolated using appropriate algorithms. However, these interpolation algorithms introduce inaccuracies in the channel estimation process which affect the data detection and decoding processes.

There is a requirement for a flexible and improved detection process which avoids introducing inaccuracies in particular through an improved channel estimation.

SUMMARY OF THE INVENTION

According to a first aspect of the invention there is provided a method of inserting pilot symbols into communication signals comprising:

generating a plurality of signals to be transmitted, each signal being divided into frames, each frame consisting of a plurality of blocks;

generating a plurality of pilot signal blocks to be inserted into the signals before transmission; inserting into each frame of each signal a pilot signal block; and characterized in that the pilot signal blocks are inserted in a time staggered fashion, spread though out the frame.

A receiver receiving a transmitted signal may make use of the pilot signal blocks in the other transmitted signals.

According to a second aspect of the invention there is provided a method of inserting pilot symbols into communication signals comprising:

generating a plurality of signals to be transmitted as a composite signal, with each signal divided into frames, each frame consisting of a plurality of blocks;

for each signal, inserting a pilot signal block into each frame before transmission; characterized in that the pilot signal block of each signal is inserted so that the pilot signal blocks within the composite signal are time staggered though the frame.

A receiver receiving a transmitted signal may use the pilot signal blocks which are present in the composite signals.

The pilot symbols are time-staggered using an arbitrary algorithm for the pilot symbol insertion. This enables each receiver to perform more accurate, continuous channel estimation and results in a reduced Bit Error Rate (BER) and an improved Quality of Service (QoS).

In a conventional system an arbitrary user k (for example: a mobile user, receiving a composite multi-user CDMA signal, with the users being synchronous) has its own time-multiplexed pilot symbols (i.e. a block of pilot symbols). The receiver for user k estimates the channel by using its dedicated pilot symbols and conventionally, the pilot symbols are time-aligned. When the pilot symbols remained time-aligned among all users the receiver may only obtain only one channel estimate per frame.

A receiver according to the invention makes use of pilot symbols of all other users in the system in order to improve its channel estimation for user k. This gives more reliable data detection and for this the receiver needs to know the channelization codes of all other users, and the positions of the respective pilot symbol blocks relative to the frame timing. It is assumed that the receivers can obtain this information from the various control channels and by knowing the pilot symbol insertion algorithm (that is, how the pilot symbol blocks are arranged). It is advantageous to time-stagger the pilot symbols among the users, the receiver can then take estimates of the time-varying mobile communication channel more often and, thus, it becomes easier to track the channel by means of interpolation or any other channel estimation algorithm. However, due to the time-varying nature of the mobile radio channel, for a good channel estimate tracking performance it is better to take several channel estimates (at different time instances) during one frame rather than taking only one at the beginning of each frame; the two algorithms presented below provide such preferred pilot symbol block-arrangements among all users within a frame.

BRIEF DESCRIPTION OF THE DRAWINGS

A more detailed description of a practical mobile cellular communication system is described below, by way of example, and with reference to the following figures, in which.

DETAILED DESCRIPTION

Figure 1:
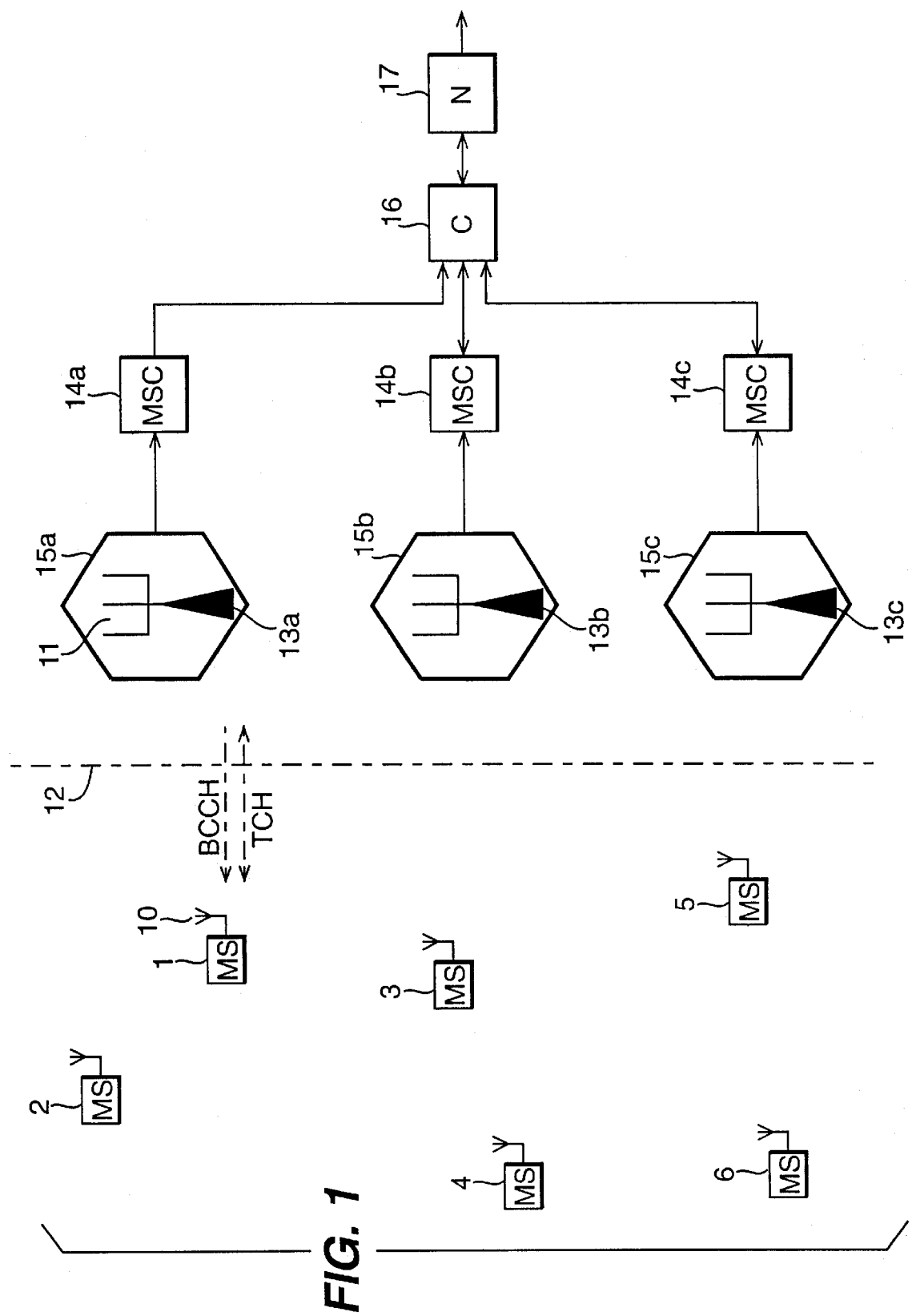
FIG. 1 shows a block diagram of a mobile cellular communication system.

FIG. 1 illustrates in outline a CDMA mobile radio communication system in which an end user device (Mobile Station 1, 2, 3, 4, 5, 6 etc.) uses a CDMA multiplexing technique to communicate with its nearest base station 13 via antennae 10 and 11, across an air interface 12. Once communications established between a mobile station and its base station, the mobile switching center (MSG) 14a may establish a further connection to another MSC (e.g. 14b) or to other networks (17) via the central controller 16. The base station broadcasts control information on the broadcast control channel (BCCH) and two way communication between the mobile and the base station is conducted on the traffic channel (TCH). The data transmitted over the traffic channel is divided into frames, with frames allocated to base to mobile station (downlink) and frames allocated to mobile to base station (uplink).

Figure 2:
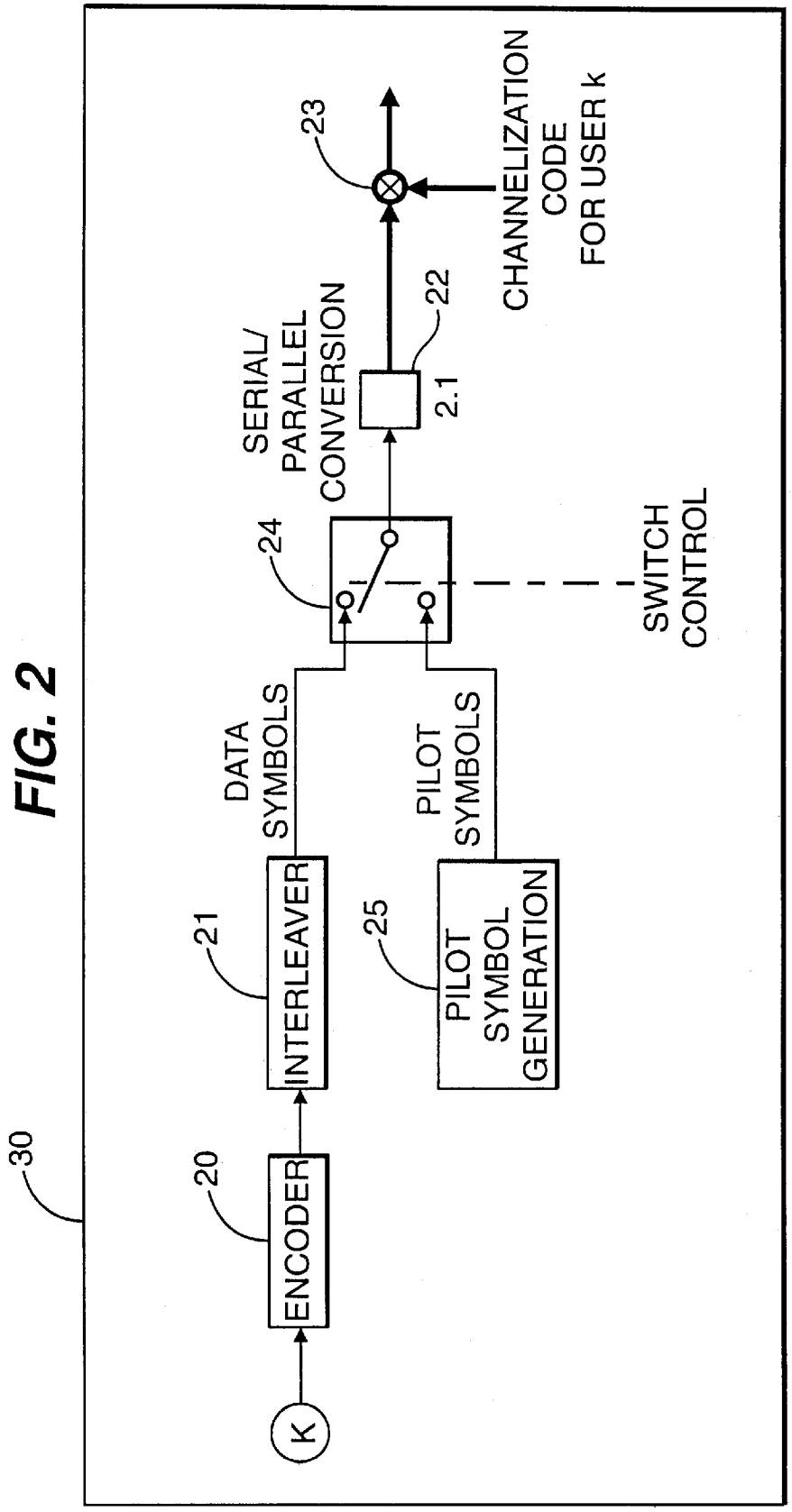
FIG. 2 shows a conventional CDMA channel generator.

FIG. 2 shows a CDMA channel generator (30) for a particular user k. A digital binary data signal which it is desired to transmit over a radio channel to a mobile station is fed to the channel encoder 20. After interleaving 21 it is mapped on complex I & Q channels by serial to parallel conversion 22; two real bit symbols are mapped to form one complex I/Q symbol. The symbol is then multiplied with the complex channelization code 23 and hence spread from bit symbol-rate to chip-rate. A simple switch 24 controls the periodical pilot symbol (25) insertion to achieve time multiplexed pilot symbols in between data symbols.

Figure 3:
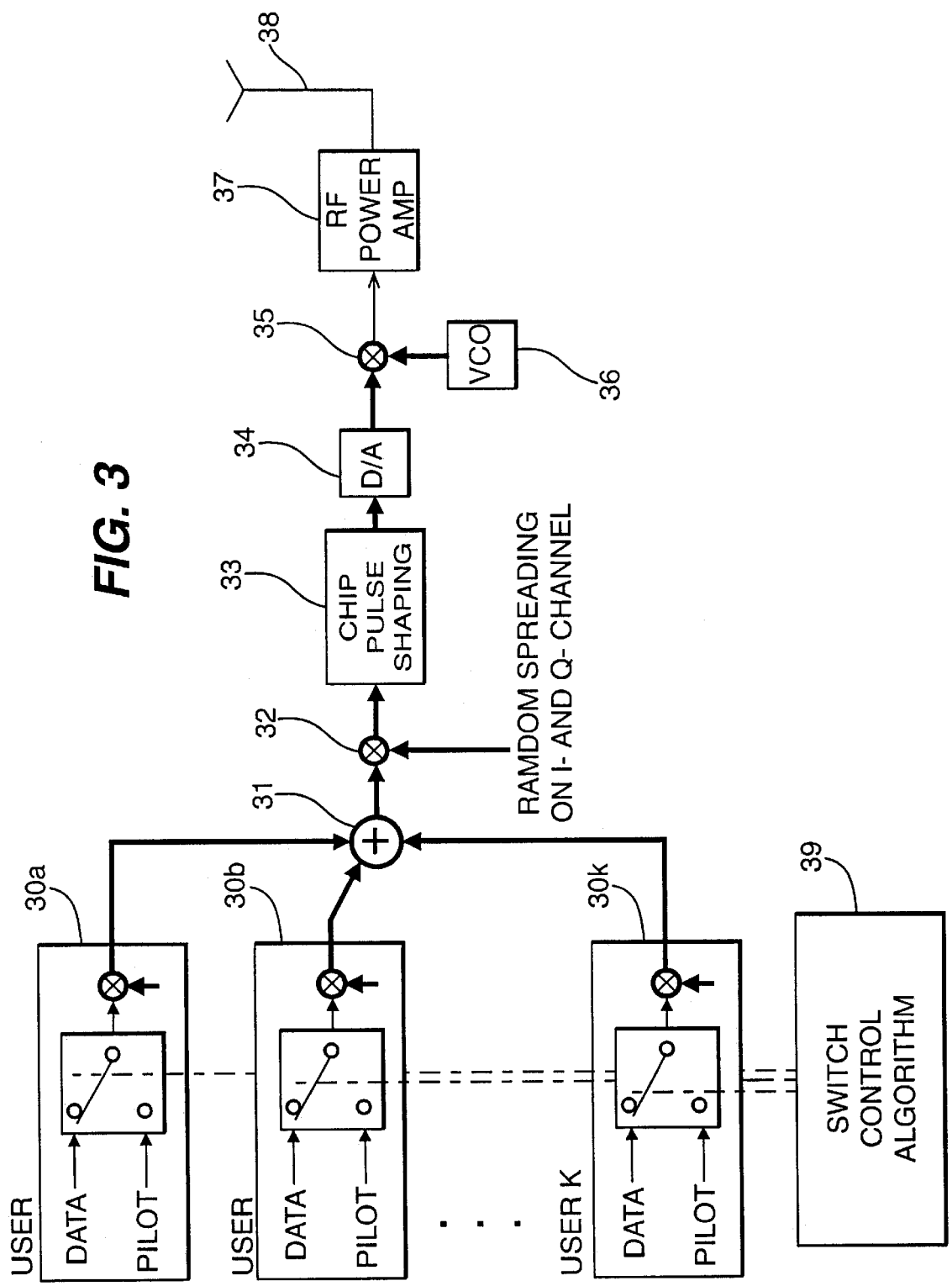
FIG. 3 shows a multi-user CDMA channel generator.

In FIG. 3 the CDMA channels of N user, generated by CDMA generator 30a, 30b, . . . 30k (shown in a shortened format), are added together (in adder 31) after user spreading to form one composite CDMA multi-user signal. This signal is further scrambled by multiplication with a scrambling sequence (32) to make the signal appear more random. After chip pulse shaping (33) and digital to analogue conversion (34) the baseband signal is up-converted (by modulator 35) to become a bandpass signal by multiplication with the desired carrier frequency, implemented through a voltage controlled oscillator (VCO 36). After radio frequency (RF) power amplification (37) the signal is fed to the antenna 38 and transmitted to the mobile terminals in the respective cell area. The pilot symbol insertion of all users is controlled by a central switch control algorithm 39.

Figure 4:
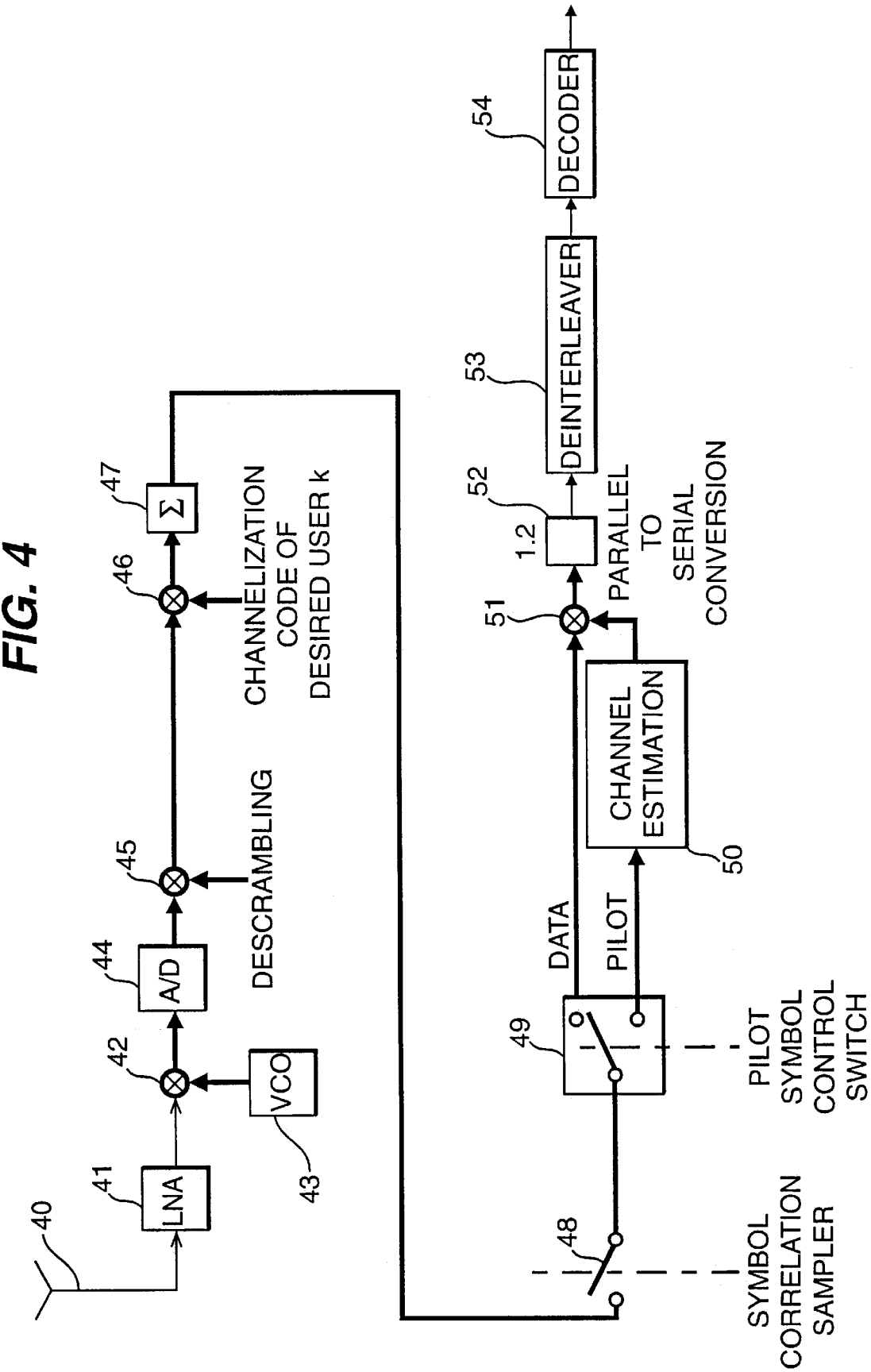
FIG. 4 shows a conventional single user CDMA receiver for use in a mobile terminal.

The receiver illustrated in FIG. 4 is used for coherent detection of a signal using time multiplexed pilot symbols. The signal is received at the antenna 40, amplified 41 with a low noise amplifier and downconverted by multiplier 42 and voltage controlled oscillator 43 to the baseband frequency. The signal is then quantized using an analogue to digital (A/D) converter 44 and descrambled 45. The signal is then multiplied 46 with the appropriate channelization code for user k. The signal is accumulated over $N_c$ chips (47) to despread the signal and then sampled at the symbol rate by sampler 48 to obtain complex symbols. Controlled by a corresponding pilot symbol control switch 49, the pilot symbols are fed to the channel estimation algorithm 50, whereas the data symbols are weighted 51 with the current output of the channel estimation algorithm to compensate for distortions in the mobile radio channel. After Parallel to serial conversion 52, deinterleaving 53 and decoding 54 the signal may be passed onto the respective data terminal, e.g. speech decoder, etc. The $N_p$ and $N_s$ can be different for each user.

For each user in a Wideband CDMA (W-CDMA) system, a frame consists of a number $N_p$ of pilot symbols and a number $N_s$ data symbols. The total number of symbols per frame is $N_{total}=N_p+N_s$, and is the same for all users in the down link.

The following algorithms may be used to calculate the position of the block of pilot symbols for the respective user k.

Algorithm 1

For any user k, k=0, . . . , K−1

$$N_{start,k} = \frac{N_{total}}{K} \cdot k \qquad (1)$$

where $N_{start,k}$ is the offset symbols relative to the flaming timing, indicating where the block of pilot symbols for user k starts $N_{total}$ is the total number of symbols per frame K is the current number of users in the system If $N_{start,k}+N_{p,k} \geq N_{total}$, then dismiss the results of (1) and calculate a new $N_{start,k}$ by setting $N_{start,k}=N_{total}-N_{p,k}$.

Algorithm 2

Whenever a new user enters the system, or an active user leaves the system, rearrange the pilot symbols such that The distance between the blocks of pilot symbols for different users is maximized if $N_{p,1}+N_{p,2}+ \ldots +N_{p,k}<N_{total}$ (that is, the sum of the number of pilot symbols over all users is less than the total number of symbols per frame).

The overlap among blocks of pilot symbols of different users is minimized if $N_{p,1}+N_{p,2}+ \ldots +N_{p,k} \geq N_{total}$ (that is, the sum of the number of pilot symbols over all users is greater than or equal to the total number of symbols per frame)

Therefore the constraint $N_{start,k}+N_{p,k} \leq N_{total}$ must be fulfilled.

Set $N_{start,0}=0$ and choose the variables $N_{start,k}$, k=1, . . . , K−1 such that $$\sum_{k=0}^{K-2}\sum_{i=k+1}^{K-1}\left(N_{start,k} + \frac{N_{p,k}}{2} - N_{start,i} - \frac{N_{p,i}}{2}\right)^2 +$$

$$\sum_{i=1}^{K-1}\left(N_{total} + \frac{N_{p,0}}{2} - N_{start,j} - \frac{N_{p,j}}{2}\right)^2$$

is minimized, with the values of $N_{start,k}$ constrained to $0 \leq N_{start,k} \leq N_{total} - N_{p,k}$. The variables have to be calculated by means of numerical approximation.

Figure 5:
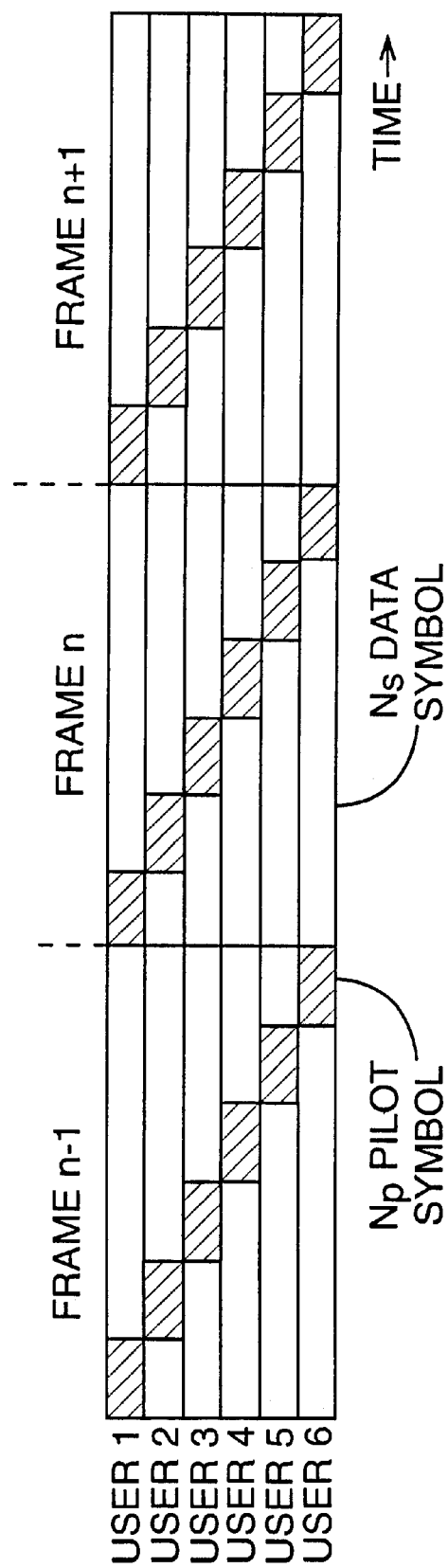
FIG. 5 shows one synchronous CDMA multi-user signal according to the invention.

FIG. 5 shows a CDMA channel with a number of users, each frame of which has a time staggered, non-overlapping but contiguous blocks of pilot symbols.

Figure 6:
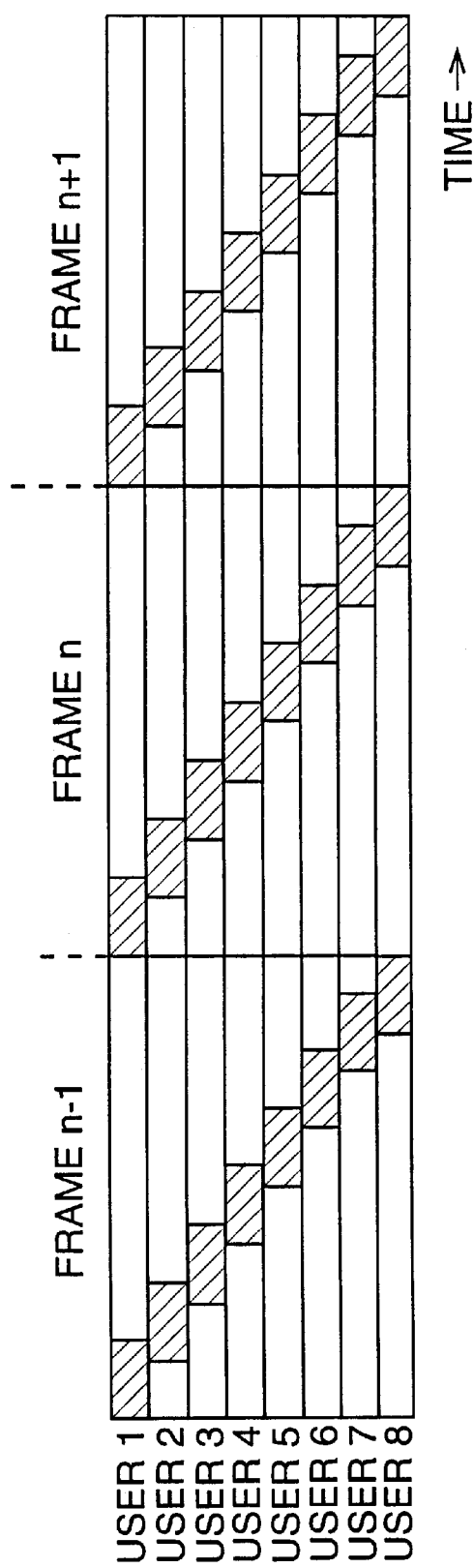
FIG. 6 shows another synchronous CDMA multi-user signal according to the invention.

FIG. 6 shows a similar multi-user CDMA channel with time staggered, overlapping, contiguous blocks of pilot symbols.

Figure 7:
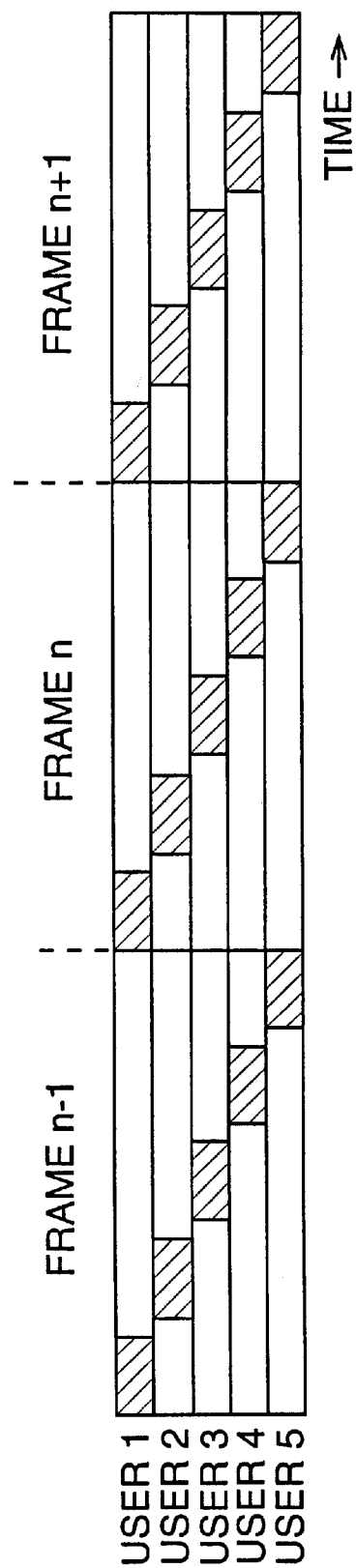
FIG. 7 shows a third synchronous CDMA multi-user signal according to the invention.

FIG. 7 shows another multi-user CDMA channel with time staggered, non-overlapping, non-contiguous blocks of pilot symbols.

Figure 8:
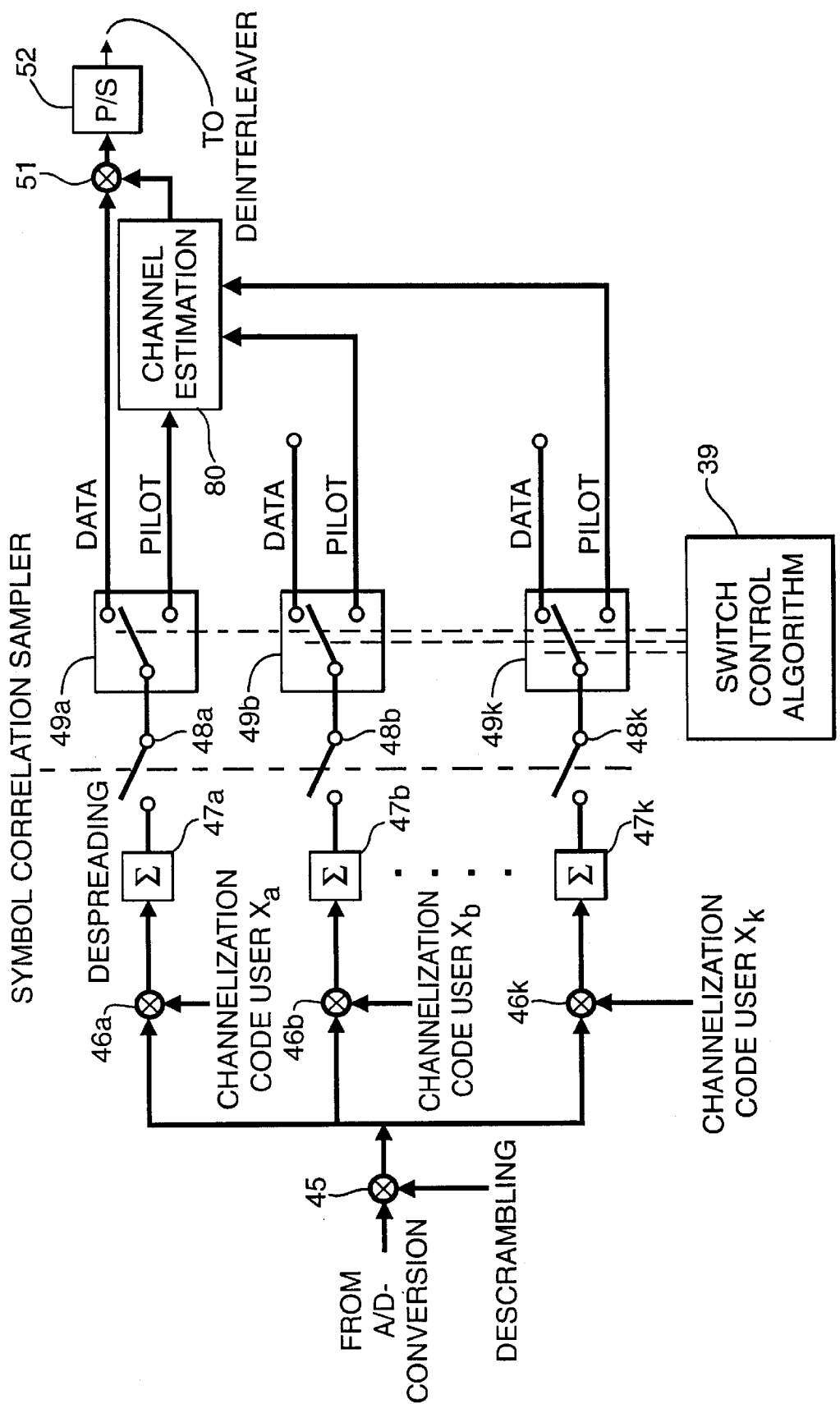
FIG. 8 shows a single-user CDMA receiver, modified to exploit the frame structure of FIGS. 5, 6 and 7.

FIG. 8 shows in outline a single-user CDMA receiver, modified to exploit the frame structure of FIGS. 5, 6 and 7. It is assumed that the receiver has knowledge of all the channelization codes of all the users of the system and also the algorithm applied to time-stagger the pilot symbols; this knowledge may for example be obtained from the various control channels. The signal from the A/D converter (not shown) is descrambled (45) and then correlated with the appropriate channelization code, $x_a$, $x_b$ ... $x_k$, for user k at mixers 46a, 46b ... 46k. The signal is accumulated over $N_c$ chips (47a, 47b ... 47k) to despread the signal and then sampled at the symbol rate by samplers 48a, 48b ... 48k to obtain complex symbols. The channel estimation algorithm (80) also makes use of all other users pilot symbols from their respective CDMA channels by correlating, for each user selected, the received, descrambled signal with the appropriate channelization code, $x_a$, $x_b$ ... $x_k$. The switching control algorithm (39) controls switches 49a, 49b ... 49k, in order to select the time-multiplexed pilot symbols inserted in the other users' CDMA signals. Depending upon the number of users within the system, the receiver can now make many more channel estimates (80) during a frame, up to having a continuous pilot signal if enough users are present. This considerably improves the detection performance of the mobile station without the disadvantages of prior art continuous pilot tone.

What is claimed is:

1. A method of inserting pilot symbols into communication signals comprising:

generating a plurality of signals to be transmitted from different users, each signal being divided into frames, each frame having of a plurality of blocks;

generating a plurality of pilot signal blocks to be inserted into the signals before transmission; and inserting into each frame of each signal a pilot signal block;

wherein the pilot signal blocks are inserted in a time staggered fashion, spread through out the frames of the plurality of signals to be transmitted from different users.

2. A method according to claim 1, comprising:

receiving a transmitted signal at a receiver using the pilot signal blocks from the plurality of signals transmitted from different users.

3. A method according to claim 1, further comprising:

using the pilot signals blocks at the receiver to perform channel estimation.

4. A method of inserting pilot symbols into communication signals comprising:

generating a plurality of signals to be transmitted from different users as a composite signal, with each signal divided into frames, each frame having a plurality of blocks; and for each signal, inserting a pilot signal block into each frame before transmission;

wherein the pilot signal block of each signal is inserted so that the pilot signal blocks within the composite signal are time staggered through the frames of the plurality of signals to be transmitted from different users.

5. A method according to claim 1 comprising:

receiver receiving a transmitted signal uses the pilot signal bloks which are present in the composite signals.

6. The method of claim 1, wherein the pilot signal blocks are non-overlapping and contiguous.

7. The method of claim 1, wherein the pilot signal blocks are overlapping and contiguous.

8. The method of claim 1, wherein the pilot signal blocks are overlapping and non-contiguous.

9. The method of claim 4, wherein the pilot signal blocks are non-overlapping and contiguous.

10. The method of claim 4, wherein the pilot signal blocks are overlapping and contiguous.

11. The method of claim 4, wherein the pilot signal blocks are overlapping and non-contiguous.

* * * * *